May 17, 1966     T. C. ZINNIGER     3,251,617
INTEGRAL FASTENER FOR SHEET MATERIAL
Filed Feb. 28, 1963
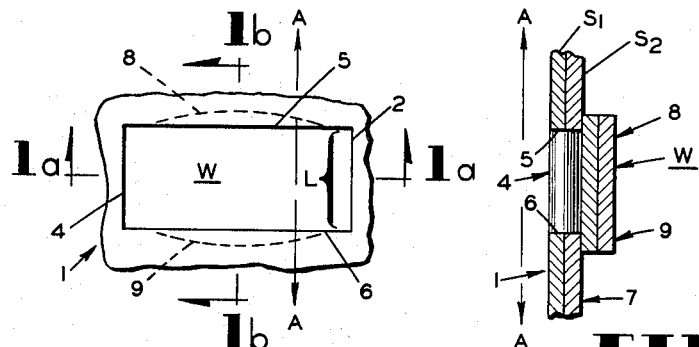
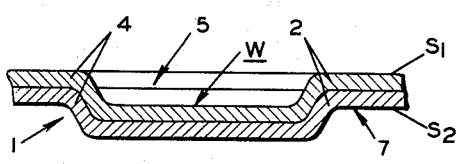
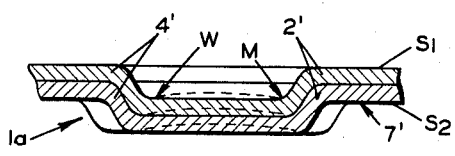
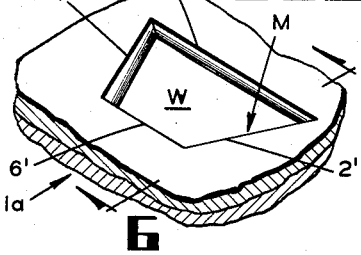
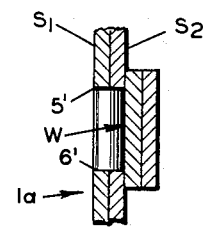
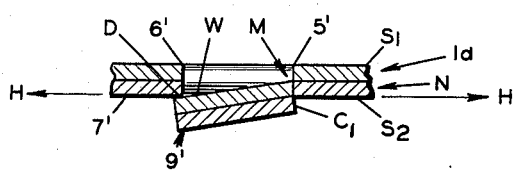
INVENTOR.
THEODORE C. ZINNIGER
BY

United States Patent Office 3,251,617
Patented May 17, 1966

3,251,617
INTEGRAL FASTENER FOR SHEET MATERIAL
Theodore C. Zinniger, Hayward, Calif., assignor to Kaiser Aluminum & Chemical Corporation, Oakland, Calif., a corporation of Delaware
Filed Feb. 28, 1963, Ser. No. 261,648
5 Claims. (Cl. 287—189.36)

This invention relates to the joining together of overlapped pieces of material by means of fastener elements formed integrally with the respective pieces of material, and particularly to the fastener elements formed thereby.

Accordingly, it is a primary purpose of this invention to provide a novel fastening element formed as an integral part of the pieces of material being fastened together.

Other purposes and advantages of the instant invention will become more apparent by reference to the following detailed description when taken in conjunction with the appended drawings, wherein FIG. 1 is a broken plan view of a fastener made in accordance with prior art practices;

FIG. 1a is a cross-sectional view of the fastener shown in FIG. 1 when taken generally along the line 1a—1a thereof;

FIG. 1b is a cross-sectional view of the fastener shown in FIG. 1 when taken generally along the line 1b—1b thereof;

FIG. 2 is a broken plan view of the novel fastener of the instant invention and indicates how a plurality of such fasteners may be employed in the form of a pattern to join pieces of material together; this figure also discloses in phantom certain trigonometrical calculations or concepts used in arriving at the preferred configuration for the fastener of the instant invention;

FIG. 3 is a cross-sectional view of a fastener shown in FIG. 2 when taken generally along the line 3—3 thereof;

FIG. 4 is a cross-sectional view of a fastener shown in FIG. 2 when taken generally along the line 4—4 thereof;

FIG. 5 is a perspective view of a modified form of fastener of the instant invention;

FIG. 6 is a sectional view generally taken along the line 6—6 of FIG. 5.

With further reference to the drawings, and in particular FIGS. 1 through 4, 5 and 6, the improved novel fastener of the instant invention is intended to overcome certain of the deficiencies which existed in prior art fasteners of the type shown in FIGS. 1 through 1b, such as the fasteners disclosed in U.S. Patents 2,254,558 and 2,924,312, issued September 2, 1941, and February 9, 1960, respectively, to I. A. Williams.

In the case of a prior art fastener of the type shown in FIGS. 1 through 1b, the spaced and parallel fold areas 2 and 4 at the side edges of the fastener constituted the weakest areas of the fastener. These fold lines 2 and 4 were located parallel to each other and at substantially right angles to the main parallel incisions or cuts 5 and 6 in the pieces of sheet material, such as metal sheets $S_1$ and $S_2$ from which the fastener was made. In general, the prior art fasteners contemplated that the composite metal web W of the fastener located between the folds 2 and 4 and incisions 5 and 6 and made up of integral parts of sheets $S_1$ and $S_2$ would be displaced out of the normal planes of the sheets $S_1$ and $S_2$ to a plane below the bottom surface 7 of the lowermost sheet of material $S_2$. After being displaced to a point below bottom surface 7, composite web W was the spread laterally outward adjacent the incisions 5 and 6, such as in the areas 8 and 9, below the bottom surface 7 of the lowermost sheet $S_2$ and into engagement with surface 7 so as to prevent disengagement of the members $S_1$ and $S_2$ from each other. Fold lines 2 and 4 are formed in the fastener 1 as the web W is displaced. These fold lines 2 and 4, however, represented the weakest parts of such a fastener in that they did not satisfactorily withstand severe shearing action applied to the joined pieces of material. By shearing action is meant the sliding action of the sheets $S_1$ and $S_2$ and folds 2 and 4 in the fastener 1 of the sheets $S_1$ and $S_2$ with respect to one another in the direction of either of the arrows A—A when opposing portions of the sheets $S_1$ and $S_2$ were subjected to a tensile pull in a direction normal to the incisions 5 and 6 and parallel to fold lines 2 and 4. When this tensile pull is exerted in the direction of either of the arrows A—A of FIG. 1, the fastener would tend to come apart as the material at the fold lines 2 and 4 of the pieces $S_1$ and $S_2$ of material fractured under the loads imposed thereon.

It has been found, however, that this weakness problem in such fasteners can be solved if the fasteners of FIGS. 1–1b are given a unique configuration. This unique configuration is preferably a trapeziform configuration.

Thus, the unique fastener element 1a of the instant invention is so made whereby it generally comprises integral portions of overlapping pieces of material which are displaced out of the respective normal planes of the said pieces of material. As indicated in FIG. 2, each of the pieces of displaced material is generally defined by a pair of laterally spaced-apart incisions 5' and 6' in the pieces, said incisions being preferably arranged parallel to each other, and a pair of preferably spaced-apart folds 2' and 4' in the pieces, said folds being arranged in angularly disposed converging relationship to each other. Each of the folds 2' and 4' also fully intersects with each of the laterally spaced-apart incisions 5' and 6' in the pieces such that one of the interior angles X of intersection is less than 90°, while the other interior angle Y of intersection is greater than 90°. Portions of each displaced piece of material adjacent at least one of the incisions is displaced completely below and underlies the bottom surface of the lowermost piece of material. In an advantageous embodiment of the invention the portion of the fastener adjacent the other incision can be comprised of portions of each piece of material which are displaced only below the bottom surface of an upper piece of material being joined by the fastener.

In the case of the fastener 1 shown in FIGS. 1–1b, this fastener is capable of transmitting its maximum load when it is designed to fail in shear along the fold lines 2 and 4 or when shear loads are applied in the direction of the arrows A—A. When however, these fold lines are arranged or oriented in converging fashion or on diagonals in the manner shown in FIG. 2, the overall shear area of the new folds 2' and 4' of fastener 1a is substantially increased. This can be graphically illustrated in the following manner, reference being made to FIGS. 1 and 2. In the case of the fastener of FIGS. 1–1b, the distance L for each of the fold lines 2 and 4, each fold line also being at a right angle to the incision lines 5 and 6, is the same. For the configuration of the fastener 1, as shown in FIG. 1, the shear area for either of the folds 2 and 4 is readily calculated as L$t$, $t$ being the combined thicknesses of the individual pieces of material in each fold line 2 or 4, and L, of course, being the length of the same.

Sloping each of the fold lines 2' and 4' in the manner indicated in FIG. 2 for new fastener 1a automatically increases the shear area of each of the new fold lines 2' and 4' of fastener 1a, as compared to fold lines 2 and 4 of fastener 1. The reason for this is illustrated by the theoretical right triangle shown schematically and superimposed partially on the fastener 1a in FIG. 2. This triangle is formed by old fold line 2 of fastener 1, the new fold line 2′ of fastener 1a and the base line represented by the reference numeral 3 as an extension of incision 6′. In forming such a triangle, it is assumed that incisions 5′ and 6′ of fastener 1a in FIG. 2 are located the same distance apart as incision lines 5 and 6 of fastener 1. In the aforesaid triangle, new fold line 2′ thus becomes the hypotenuse of the triangle and, consequently, is longer than old fold line 2. Trigonometrically, therefore, the shear area of a new fold line 2′ or 4′ increases by the reciprocal of the sine of the angle $\vartheta$ of the above right triangle. Thus, whereas the shear area for either fold line 2 or 4 in the case of the fastener 1 of FIG. 1 is simply $Lt$, the shear area of either of the fold lines 2′ or 4′ in the fastener 1a of FIG. 2 is $L_1 t_1$, $L_1$ being the length of either of the fold lines 2′ or 4′ and $t_1$ being the combined thickness of the individual pieces of material in each of the new fold lines 2′ and 4′. Since $L_1$ equals $$\frac{L}{\sin \vartheta}$$

the new shear area of fold line 2′ or 4′ for fastener 1a can be written as $$\frac{L t_1}{\sin \vartheta}$$

In addition to increasing the shear area, sloping of the sides or folds 2′ and 4′ of the fastener 1a decreases the shear loads on each of the folds. This is illustrated graphically in the triangulation or diagram of forces superimposed upon the fastener element 1a shown in FIG. 13. FIG. 13 indicates that the applied load F which is applied in a direction parallel to that of a fold line 4 of a fastener 1 and normal to the incisions 5′ and 6′ automatically breaks down in the case of fastener 1a into components parallel and normal to diagonally disposed fold line 4′ of fastener 1a, such as components C and S. Component C represents the portion of the load F which is applied in the form of a compressive load on the new fold line 4′ of fastener 1a, while the component S which parallels new fold 4′ of fastener 1a represents the portion of the load F which is applied in the form of a shear load.

In the case of fastener 1a, therefore, the shear load S is always less than the applied load F because in the right triangle of forces formed by C, S and F, F becomes the hypotenuse of the triangle; and S being one of the sides of the triangle, it must always be less than F. From the above, it follows that the shear load S per unit area of a diagonally disposed fold line 4′ of fastener 1a in the above example will necessarily be less than in the case of where the applied load F is not broken down into separate shear and compressive components but remains as a single load applied along the length of and parallel to a fold line, such as fold line 4 of a prior art fastener 1. In the above example, it is also assumed that incision lines 5′ and 6′ of fastener 1a are located the same distance apart as incision lines 5 and 6 of a prior art fastener 1.

In a further advantageous embodiment, and as indicated in FIGS. 5 and 6, the fastener 1a of the instant invention can be made in such a way that the integral portions of the pieces of material $S_1$ and $S_2$ that are displaced out of the normal planes of the respective pieces of material in the form of the composite web W would be so displaced that the fastener would have a tapered configuration in a plane normal to the incisions 5′ and 6′, such as in the plane H of FIG. 11, and only a portion 9′ of the fastener 1a adjacent one of the incision lines would be located completely below the bottom surface 7′ of the lowermost sheet $S_2$ and thereafter spread underneath this bottom surface in the area D with the portion of the fastener displaced along the other shear line having only a partial thickness $C_1$ located below the bottom surface of the lowermost sheet $S_2$. By making the fastener in this way, the high unit loading at the point M by loads applied in the direction of the arrow N is lessened since the bearing area between the different thicknesses of material is increased simply by sloping the pierced segment or composite web W.

In general, it can be said that during the preferred forming of a fastener 1a of the instant invention, the portions or pieces of material constituting the composite main body or web W of a fastener are first severed from the overlapping sheets $S_1$ and $S_2$ along incision lines 5′ and 6′ which are preferably parallel and spaced equidistant apart along their length. Thereafter, the composite web W is displaced along both the incision lines 5′ and 6′ and along the spaced converging fold lines 2′ and 4′. Each of the spaced converging lines 2′ and 4′ also fully intersects with the incision lines 5′ and 6′. The composite web W is displaced from the normal planes of the sheets $S_1$ and $S_2$ from which composite web W is made under the action of a suitable form of punch until at least a part of the displaced web W adjacent one of the incisions 5′ or 6′ is first completely located below the bottom surface 7′ of the lowermost piece of material $S_2$ being joined and thereafter spread against the said bottom surface 7′. Apparatus that may be used for fabricating the fasteners of the instant invention are illustrated and claimed in my co-pending application Serial No. 435,777, filed February 5, 1965.

Advantageous embodiments of the invention have been herein disclosed and described. It is obvious that the various changes and modifications may be made therein without departing from the spirit and scope thereof, as defined in the appended claims, wherein what is claimed is:

1. A fastener for joining together overlapping pieces of material which comprises integral portions of the overlapping pieces of material displaced out of the respective normal planes of said integral portions of said pieces of material, each of said displaced integral portions of the said pieces of material being defined by a pair of laterally spaced-apart incisions in said pieces of material and a pair of angularly disposed converging folds in said pieces of material, each of the said folds also intersecting each of the said incisions in said pieces of material, the parts of the fastener made up of said folds serving to resist the shear forces to which said fastener is subjected during use and one of the interior angles formed at the intersection of one of said folds with one of the incisions being less than 90° while the other interior angle formed at the intersection of said last-mentioned fold with the other of said incisions is greater than 90°.

2. A fastener for joining together overlapping pieces of material which comprises integral portions of the overlapping pieces of material displaced out of the respective normal planes of said integral portions of said pieces of material, each of said displaced integral portions of the said pieces of material being defined by a pair of laterally spaced-apart incisions in said pieces of material and a pair of angularly disposed converging folds in said pieces of material, each of the said folds also intersecting each of the said incisions in said pieces of material, the parts of the fastener made up of said folds serving to resist the shear forces to which said fastener is subjected during use and the displaced integral portions of said pieces of material comprising a web integrally connected to each of said folds having an arcuate cross-sectional configuration intermediate the said folds.

3. A fastening element for joining together overlapping pieces of material which comprises integral portions of the overlapping pieces of material displaced out of the respective normal planes of said integral portions of said pieces of material, said displaced portions comprising a composite web defined by a pair of laterally spaced-apart and parallel incisions in said pieces of material and a pair of spaced-apart angularly disposed and converging folds in said pieces of material, each of said folds also intersecting each of the parallel incisions in said pieces of material, said composite web adjacent one of the incisions being displaced completely below and underlying the lower surface of the bottom piece of material being joined and the part of said composite web adjacent the other incision being comprised of portions of each piece of material which are displaced below the lower surface of an upper piece of material being joined and one of the interior angles formed at the intersection of one of said folds with one of the parallel incisions being less than 90° while the other interior angle formed at the intersection of said last-mentioned fold with the other of said parallel incisions is greater than 90°.

4. A fastening element for joining together overlapping pieces of material which comprises integral portions of the overlapping pieces of material displaced out of the respective normal planes of said integral portions of said pieces of material, said displaced portions comprising a composite web defined by a pair of laterally spaced-apart incisions in said pieces of material and a pair of spaced-apart angularly disposed and converging folds in said pieces of material, each of said folds also intersecting each of the incisions in said pieces of material and at other than interior angles of 90°, said composite web adjacent one of the incisions being displaced completely below and underlying the lower surface of the bottom piece of material being joined and the part of said composite web adjacent the other incision being comprised of portions of each piece of material which are displaced below the lower surface of an upper piece of material being joined and with only the lowermost one of said last-mentioned portions of the pieces of material also being displaced below the lower surface of the bottom piece of material such that the composite web is inclined to the normal planes of said pieces of material.

5. A fastening element for joining together overlapping pieces of material which comprises integral portions of the overlapping pieces of material displaced out of the respective normal planes of said integral portions of said pieces of material, said displaced portions comprising a composite web defined by a pair of laterally spaced-apart and parallel incisions in said pieces of material and a pair of spaced-apart angularly disposed and converging folds in said pieces of material, each of said folds also intersecting each of the parallel incisions in said pieces of material and at other than interior angles of 90°, said composite web adjacent one of the incisions being displaced completely below and underlying the lower surface of the bottom piece of material being joined and the part of said composite web adjacent the other incision being comprised of portions of each piece of material which are displaced below the lower surface of an upper piece of material being joined and with only the lowermost one of said last-mentioned portions of the pieces of material also being displaced below the lower surface of the bottom piece of material such that the composite web is inclined to the normal planes of said pieces of material.

References Cited by the Applicant

UNITED STATES PATENTS

| | | | |
|---|---|---|---|
| 384,118 | 6/1888 | Bellinger | 189—36 |
| 1,355,213 | 10/1920 | Chypenfield | 189—36 |
| 1,814,703 | 7/1931 | Johnson | 29—509 |
| 2,254,558 | 9/1941 | Williams | 189—36 |
| 2,905,123 | 9/1959 | Dean | 113—1.1 |
| 2,945,462 | 7/1960 | Oberauer | 113—1.1 |
| 3,010,199 | 11/1961 | Smith et al. | 29—509 |

HARRISON R. MOSELY, *Primary Examiner.*

P. M. CAUN, *Assistant Examiner.*